US007577628B2

(12) United States Patent
Stanfill

(10) Patent No.: US 7,577,628 B2

(45) **Date of Patent: *Aug. 18, 2009**

(54) STARTUP AND CONTROL OF GRAPH-BASED COMPUTATION

(75) Inventor: Craig W. Stanfill, Lincoln, MA (US)

(73) Assignee: Architecture LLC, Lexington, MA (US)

( * ) Notice: Subject to any disclaimer, the term of this patent is extended or adjusted under 35 U.S.C. 154(b) by 71 days.

This patent is subject to a terminal disclaimer.

(21) Appl. No.: 11/467,724

(22) Filed: Aug. 28, 2006

(65) Prior Publication Data

US 2007/0022077 A1 Jan. 25, 2007

Related U.S. Application Data

(63) Continuation of application No. 10/268,509, filed on Oct. 10, 2002, now Pat. No. 7,167,850.

(51) Int. Cl.
*G06F 17/00* (2006.01)
*G06N 5/00* (2006.01)

(52) U.S. Cl. ........................................................ 706/45

(58) Field of Classification Search .................... 706/45
See application file for complete search history.

(56) References Cited

U.S. PATENT DOCUMENTS 4,972,314 A 11/1990 Getzinger et al.
5,323,452 A * 6/1994 Dickman et al. ....... 379/201.04
5,805,462 A * 9/1998 Poirot et al. .................. 716/18
5,933,640 A 8/1999 Dion
5,966,072 A 10/1999 Stanfill et al.
6,088,716 A 7/2000 Stanfill et al.
6,259,988 B1 * 7/2001 Galkowski et al. .......... 701/202
6,314,114 B1 11/2001 Coyle et al.
6,330,008 B1 12/2001 Razdow et al.
6,437,796 B2 8/2002 Sowizral et al.
6,449,711 B1 9/2002 Week
6,480,876 B2 11/2002 Rehg et al.
6,496,961 B2 * 12/2002 Gupta et al. .................. 716/5
6,584,581 B1 6/2003 Bay et al.
6,608,628 B1 8/2003 Ross et al.
6,611,862 B2 8/2003 Reisman (Continued)

OTHER PUBLICATIONS

Ou et al. "Arhitecture-Indpendent Locality-Improving Transformations of Computational Graphs Embedded in κ-Dimensions" ACM, 1995. pp. 289-298.*

(Continued)

*Primary Examiner*—Michael B Holmes
(74) *Attorney, Agent, or Firm*—Fish & Richardson P.C.

(57) ABSTRACT

An approach to performing graph-based computation uses one or both of an efficient startup approach and efficient control using process pools. Efficient startup of a graph-based computation involves precomputing data representing a runtime structure of a computation graph such that an instance of the computation graph is formed using the precomputed data for the required type of graph to form the runtime data structure for the instance of the computation graph. Pools of processes that are each suitable for performing computations associated with one or more vertices of the computation graphs are formed such that at runtime, members of these pools of processes are dynamically assigned to particular vertices of instances of computation graphs when inputs are available for processing at those vertices.

32 Claims, 7 Drawing Sheets

GRAPH INSTANCE
320 HEADER
322 #VERT. 324 #LINK
330 VERTICES
337 POOL 338 CONFIG. DATA
IN-LINKS OUT-LINKS #IN.
334 335 336
310 TEMPLATE
332
340 LINKS
346 SOURCE VERT. 347 DEST. VERT.
BUFFER LOC. CONFIG. DATA
342 344 345
352
352
350 BUFFERS
FIFO QUEUE PENDING
360 362
352
300

U.S. PATENT DOCUMENTS

| | | | | |
|---|---|---|---|---|
| 6,651,234 | B2 * | 11/2003 | Gupta et al. | 716/7 |
| 6,654,907 | B2 | 11/2003 | Stanfill et al. | |
| 6,658,464 | B2 | 12/2003 | Reisman | |
| 6,813,761 | B1 | 11/2004 | Das et al. | |
| 6,848,100 | B1 | 1/2005 | Wu et al. | |
| 6,879,946 | B2 * | 4/2005 | Rong et al. | 703/2 |
| 7,062,483 | B2 * | 6/2006 | Ferrari et al. | 707/3 |
| 7,085,426 | B2 * | 8/2006 | August | 382/260 |
| 7,103,620 | B2 * | 9/2006 | Kunz et al. | 708/200 |
| 7,130,484 | B2 * | 10/2006 | August | 382/266 |
| 7,165,030 | B2 * | 1/2007 | Yi et al. | 704/238 |
| 7,167,850 | B2 * | 1/2007 | Stanfill | 706/45 |
| 2001/0055019 | A1 | 12/2001 | Sowizral et al. | |
| 2002/0080181 | A1 | 6/2002 | Razdow et al. | |
| 2002/0091747 | A1 | 7/2002 | Rehg et al. | |
| 2002/0091748 | A1 | 7/2002 | Rehg et al. | |
| 2002/0129340 | A1 * | 9/2002 | Tuttle | 717/132 |
| 2002/0184616 | A1 | 12/2002 | Chessell et al. | |
| 2003/0023413 | A1 * | 1/2003 | Srinivasa | 703/2 |
| 2005/0177531 | A1 * | 8/2005 | Bracewell | 706/45 |

OTHER PUBLICATIONS

Efficient graph-based computation and manipulation of functional decision diagrams Kebschull, U.; Rosenstiel, W.; Design Automation, 1993, with the European Event in ASIC Design. Proceedings. [4th] European Conference on Feb. 22-25, 1993 pp. 278-282 Digital Object Identifier 10.1109/EDAC.1993.386463.*

Ou et al., "Architecture-Independent Locality-Improving Transformations of Computational Graphs Embedded in κ-Dimensions", Proceedings of the 9$^{th}$ Intl Conf on Supercomputing, 1995.

Cytron et al., "Efficiently Computing Static Single Assignment Form and the Control Dependence Graph", ACM Transactions of Programming Languages and Systems, vol. 13, No. 4, Oct. 1991.

Martin et al., "Models of computations and Systems-Evaluation of Vertex Probabilities in Graph Models of Computations", Journal of the Association for Computing Machinery, vol. 14, No. 2, Apr. 1967.

Baer et al., "Legality and Other Properties of Graph Models of Computations", Journal of the Association for Computing Machinery, vol. 17, No. 3, Jul. 1970.

Stanfill, "The Marriage of Parallel Computing and Information Retrieval", IEE Colloquium on Parallel Techniques for Information Retrieval, Apr. 1989.

Stantfill, "Massively Paralle Information Retrieval for Wide Area Information Servers", 1991 IEEE International Conference on Systems, Man and Cybernetics, Oct. 1991.

Wah et al., "Report on Workshop on High Performance Computing and Communications for Grand Challenge Applications", IEE Transactions on Knowledge and Data Engineering, Feb. 1993.

Li et al., "A Practical External Sort for Shared Disk MPPs", Proceedings of Supercomputing '93, 1993.

Stanfill et al., "Parallel Free-Text Search on the Connection Machine System", Communications of the ACM, vol. 29, No. 12, Dec. 1996.

Bookstein et al., "Modeling Word Occurences for the Compression of Concordances", ACM Transactions on Information Systems, vol. 15, No. 3, Jul. 1997.

Babaoglu, O et al. "Mapping parallel computations onto distributed systems in Paralex" Compuero '91. Advanced Computer Technology, Reliable Systems and Applications. 5$^{th}$ Annual European Computer Conference. Proceedings. Bologna, Italy May 13-16, 1991, Los Alamitos, CA, USA, IEEE Comput. Soc, US, May 13, 1991, pp. 123-130.

Gamma et al. "Design Patterns: Elements of Reusable Object-Oriented Software", Sep. 1999.

* cited by examiner

STARTUP AND CONTROL OF GRAPH-BASED COMPUTATION

CROSS-REFERENCE TO RELATED APPLICATIONS

This application is a continuation application of and claims priority to U.S. application Ser. No. 10/268,509, filed on Oct. 10, 2002, now U.S. Pat. No. 7,167,850 incorporated herein by reference.

BACKGROUND

This invention relates to execution of graph-based computations.

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. One approach to executing a graph-based computation is to execute a number of processes, each associated with a different vertex of the graph, and to establish communication paths between the processes according to the links of the graph. For example, the communication paths can use TCP/IP or UNIX domain sockets, or use shared memory to pass data between the processes.

SUMMARY

In a general aspect of the invention, a method for efficient startup of a graph-based computation involves precomputing data representing a runtime structure of a computation graph such that an instance of the computation graph is formed using the precomputed data for the required type of graph to form the runtime data structure for the instance of the computation graph.

In another general aspect of the invention, a method for efficient control of graph-based computation involves forming pools of processes that are each suitable for performing computations associated with one or more vertices of the computation graphs. At runtime, members of these pools of processes are dynamically assigned to particular vertices of instances of computation graphs when inputs are available for processing at those vertices.

Another general aspect of the invention involves a combination of the efficient startup and process pool aspects.

In one aspect, in general, the invention features a method for processing graph-based computations. One or more graph templates are provided. Each graph template is associated with a different type of computation graph and each computation graph includes a number of graph elements. Each graph element is associated with a corresponding computation. One or more pools of computing resources are formed. Each graph element of a computation graph is associated with a corresponding one of the pools of computing resources. One or more data streams are processed. Each of the data streams is associated with a corresponding type of computation graph. For each of the data streams, processing of the data stream includes forming a graph instance from a graph template for the corresponding computation graph. For each of the graph elements of the graph instance, computer resources from corresponding pools are assigned to the graph elements. Each data stream is processed with a graph instance, including performing the computations corresponding to the graph elements of such graph instance using the assigned computing resource.

Aspects of the invention include one or more of the following features:

The graph elements can include vertices or links of the computation graph.

The computation resources can include processes, processes threads, or database connections.

Providing the one or more graph templates can include storing the templates in volatile memory or in non-volatile memory.

The graph instance can be formed from the graph template in volatile memory.

Forming the graph instance can includes allocating a portion of the memory to the graph instance and copying the graph template to that portion of the memory.

Computing resources can be assigned dynamically for part of the computation on the data stream.

Computing resources can be assigned when at least some part of all of the inputs for such part of the computation are available.

Computing resources can be assigned when all of the inputs for such part of the computation are available.

Assigning each of the computing resources dynamically can include deassigning the computation resource from the graph element.

Each of the computing resources for a graph element can be assigned for processing all of the data stream.

The method can further include releasing the computing resources assigned to graph elements and destroying the instance of the graph.

At least two data streams each associated with a different computation graph can be processed concurrently.

At least one graph element of instances of each of different computation graphs can be associated with a same corresponding pool of computation resources.

At least one computing resource of a same corresponding pool of computation resources can be assigned at different times to a graph element of instances of different computation graphs.

In another aspect, in general, the invention features software, stored on a computer-readable medium, for processing graph-based computations.

In another aspect, in general, the invention features a system for processing graph-based computations.

Aspects of the invention can include one or more of the following advantages:

The computational overhead associated with creating instances of computation graphs is reduced as compared to establishing separate communication paths between vertices at the time the graphs are instantiated.

In one embodiment, use of shared memory provides an efficient communication channel for passing data between processes implementing computations for the vertices of the computation graph.

Process pools reduce the overhead associated with creating and initializing processes for performing the computations associated with vertices of a computation graph.

Use of a dynamically assigned pools of processes reduces the resources that might otherwise be used by processes waiting for input.

Other features and advantages of the invention are apparent from the following description, and from the claims.

DESCRIPTION

1. Overview

Figure 1:
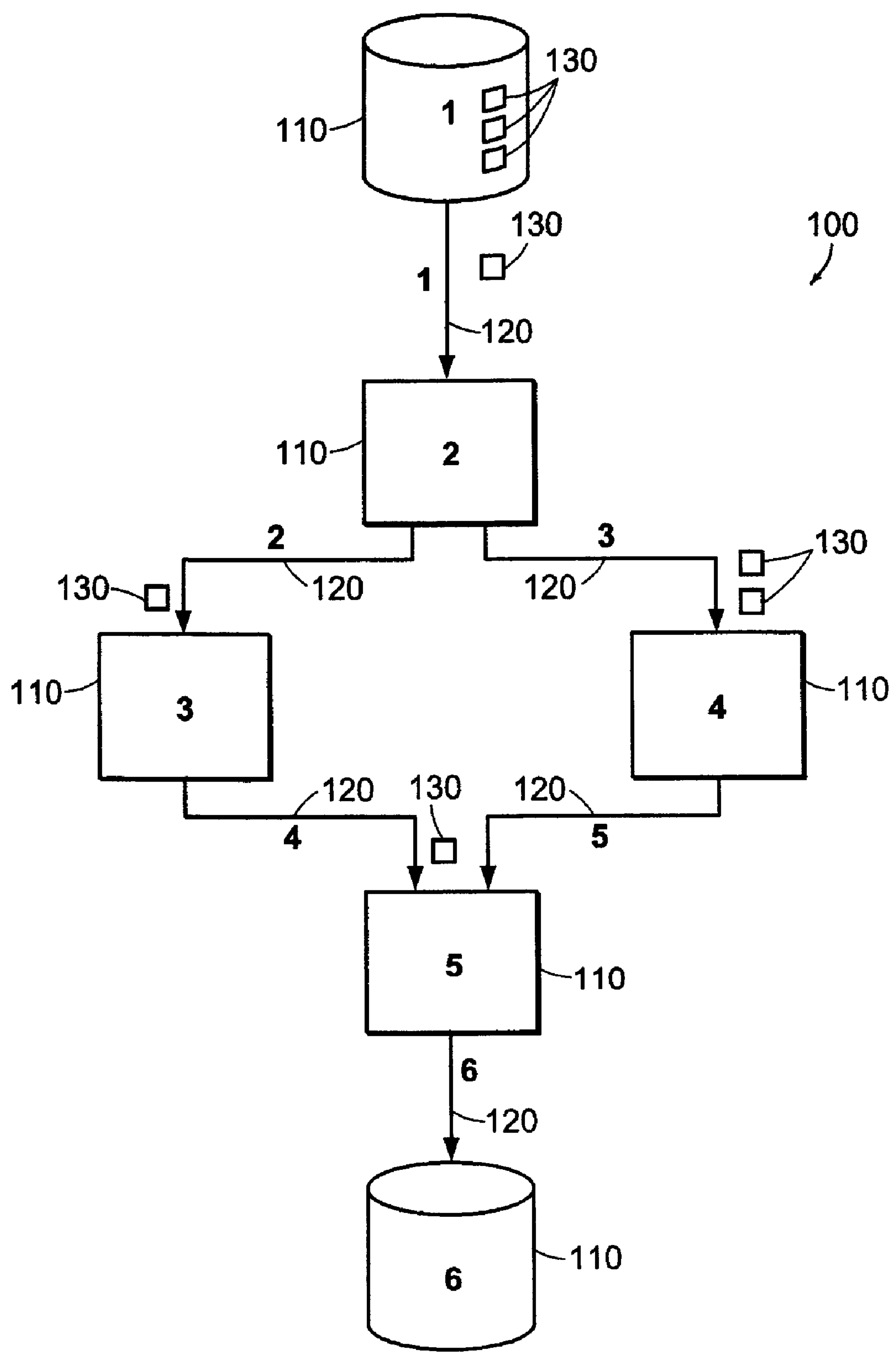
FIG. 1 is a diagram that illustrates an instance of graph-based computation.

The system described below implements a method for executing computations that are defined in terms of computation graphs. Referring to FIG. 1, an example of a computation graph 100 includes a number of vertices 110 that are joined by unidirectional links 120. In the example shown in FIG. 1, vertices 110 are numbered from 1 to 6, and links 120 are also numbered from 1 to 6. Computation graph 100 processes a work flow that is made up of a series of work elements 130, such as individual transactions that are processed according to a computation graph associated with a transaction processing system. Each vertex is associated with a portion of the computation defined by the overall computation graph. In this example, vertex 1 provides access to storage for an initial series of work elements 130, and passes that series on its output link 1. Processes that implement the computation associated with each of the vertices process the work elements 130 in turn, and typically produce a work element on one or more of the output links of that vertex.

As illustrated in FIG. 1, a work element 130 is in transit on link 1, a work element is queued ready for processing at vertex 3, and two work elements are queued for processing at vertex 4. Therefore, the processes for vertex 3 and vertex 4 are ready to run to process a queued work element. As illustrated, vertex 5 has a work element queued on one of its inputs, link 4, but not on the other input, link 5. Therefore the process associated with vertex 5 is not ready to run.

Figure 2:
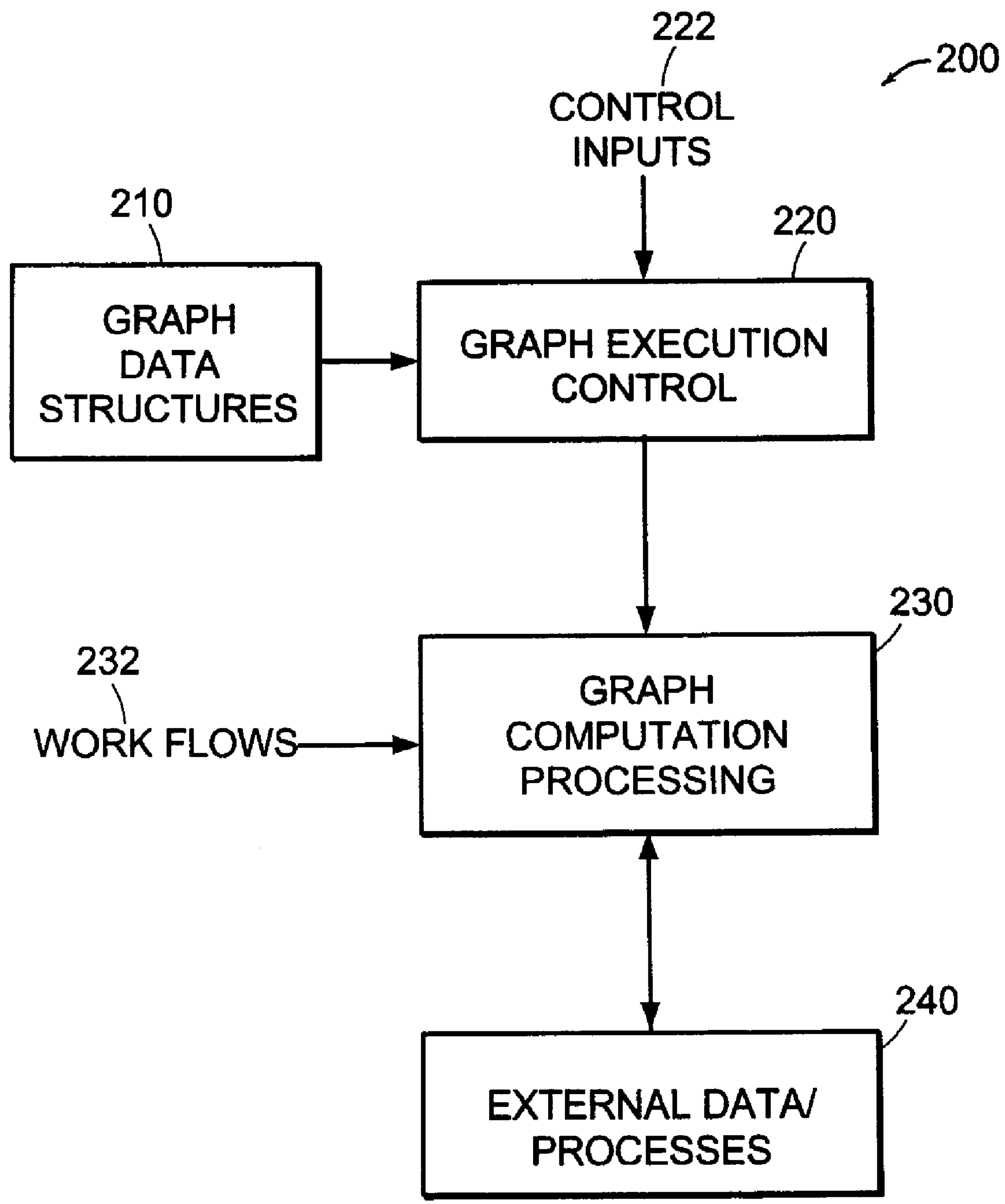
FIG. 2 is a logical block diagram of a system for processing work flows.

Referring to FIG. 2, a system 200 for processing work flows includes stored graph data structures 210. These data structures include specifications of computation graphs that include characteristics of the vertices and links of the graphs. A graph execution and control ("GEC") module 220 of the system receives control inputs 222 including commands to process particular work flows 232 using corresponding computation graphs, which are specified in the stored graph data structures 210. The GEC module 220 uses the specifications of the computation graphs to control graph computation processing 230, which is generally made up of multiple processes. The processes that implement graph computation processing 230 can make use of external data and processes 240, which include database engines, data storage, or other modules that are accessed during processing associated with vertices of the computation graphs.

In general, different types of work flows are processed using different types of computation graphs 100, and different work flows may be processed concurrently, each being processed by a different instance of a graph. System 200, through the GEC module 220, allocates resources for the instances of computation graphs and controls their execution to process the work flows.

2. Graph Data Structures

System 200 includes a number of features that provide rapid startup of graph computations as well as efficient sharing of limited resources.

Before processing a work flow with an instance of a computation graph, the GEC module 220 creates a runtime data structure for that graph instance in a functionally shared memory. In one embodiment, a single shared memory segment is created in which all the runtime data structures for graph instances are created.

Processes are associated at runtime with the vertices of the graph and each of these processes maps the shared memory segment into their address space. The processes read and write work elements from and to the runtime data structures for the graph instances during processing of the work flows. That is, data for the work elements that flow through the graph are passed from process to process through this runtime data structures in the shared memory segment.

Graph computation processing 230 may be hosted on a general-purpose computer under the control of a suitable operating system, such as the UNIX operating system. The shared memory for an instance of the graph preferably is accessible using standard system services (e.g., the mmap( ) UNIX system service) that provide memory mapping functions to mapped the shared memory segment holding the runtime graph data structures into the address spaces of the processes implementing the computation graph.

Figure 3:
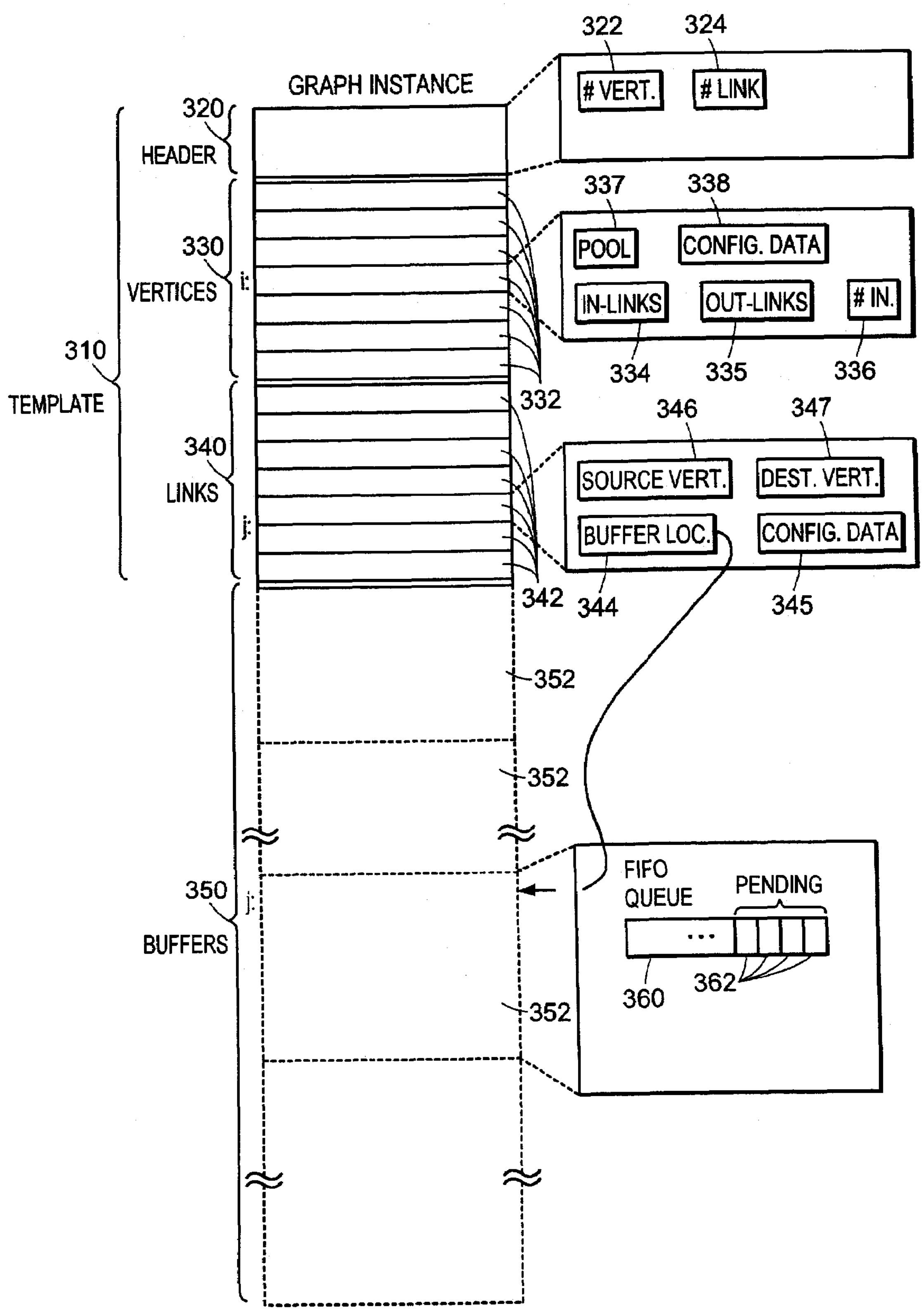
FIG. 3 is one embodiment of a data structure for a graph instance.

FIG. 3 is one embodiment of a runtime graph data structure 300 for an instance of a computation graph. A header section 320 includes the number of vertices 322 and the number of links 324 of the graph. Runtime graph data structure 300 also includes a vertex section 330 that specifies the vertices of the graph in a series of records 332, each associated with a different vertex. The runtime structure also includes a link section 340, which includes link records 342 each specifying a different link of the graph. Runtime graph data structure 300 also includes a buffer section 350, which holds work element data as the work elements are passed between vertices of the computation graph and queued prior to processing at a vertex.

In vertex section 330, each vertex record 332 typically includes data that identifies the input links 334 for the corresponding vertex and the output links 335 for the vertex. For example, the links and the vertices may be numbered consecutively from 1, and the input and output link data for a vertex may be represented as a list of indices including those links.

In this example, each vertex record 332 also includes storage for an input count 336 that indicates the number of inputs that do not have a work element queued and waiting for processing. During execution of the graph, this variable is initialized to the number of input links for the vertex, is decremented as input becomes available on each input for a vertex, incremented when an input queue is empties, and reaches zero when there is an input available on each input and the process for that vertex is ready to run.

In this example, each vertex record 332 also includes a process pool identification 337 that specifies a pool of processes associated with that vertex (a further discussion of process pools is included later in this description). Processes in the identified pool are used to perform the processing for that vertex. In general, the processing for a vertex can be performed by any member of the identified pool. Processes are dynamically allocated for each work element and therefore different work elements that are processed by the same vertex in an instance of a computation graph may be processed by different members of the identified pool. Vertex record 332 optionally includes configuration data 338 that is used to tailor any member process of the identified pool to perform the particular processing for that vertex.

Link section 340 of runtime graph data structure 300 specifies the links of the graph in link records 342. Each link record 342 may include data that identifies the source vertex 346 for that link and the destination vertex 347 for the links. Each link record optionally includes configuration data 345 that is used when the runtime data structure is created.

Buffer section 350 of runtime graph data structure 300 includes a number of separate buffer areas 352 associated with the links of the graph. Each link record 342 typically includes a buffer location 344 that identifies a corresponding buffer area 352 for that link record. Each buffer area typically includes a FIFO queue 360 that holds a number of work elements 362 that have not yet been processed by the destination vertex of the corresponding link.

Figure 4:
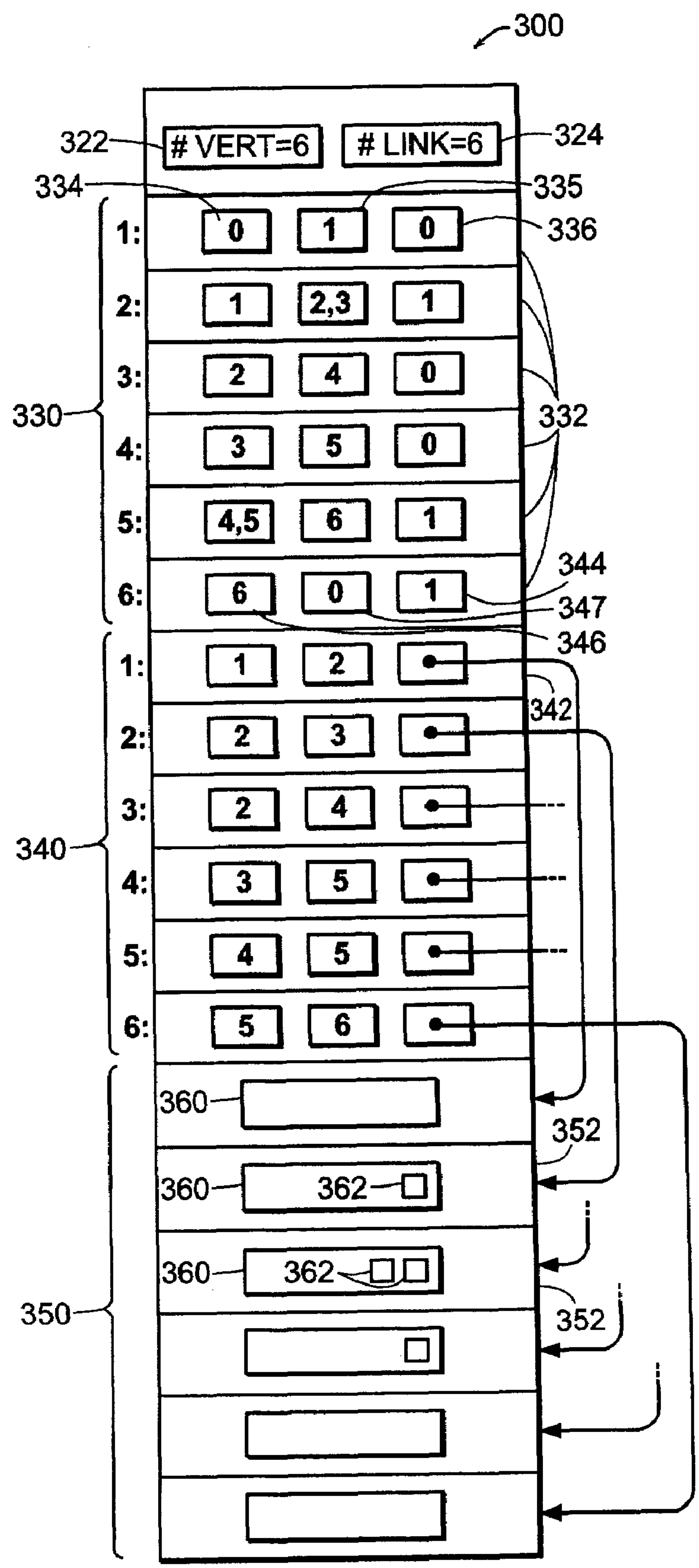
FIG. 4 is a data structure for the computation graph shown in FIG. 1.

Referring to FIG. 4, a runtime graph data structure 300 for the example of a computation graph 100 shown in FIG. 1 indicates that there are 6 vertices and 6 links in the header. Vertex section 340 has six vertex records 332. For example, the vertex record 332 for vertex 1 indicates in entry 334 that there are no input links and in entry 335 that link 1 is an output link. The vertex record 332 for vertex 2 indicates that link 1 is an input link and that links 2 and 3 are output links. As illustrated in FIG. 1, a work element for vertex 2 is not queued ready for processing, and therefore the input count 336 of the vertex record indicates that there is still one unsatisfied input.

Link section 350 includes six link records 340, one for each of the links of the computation graph. For example, the link record 342 for link 1 has an entry 346 that indicates that the source vertex is vertex 1 and an entry 347 that indicates that the destination vertex is entry 2. An entry 344 of link record 342 provides a way of accessing the corresponding buffer record 352 of buffer section 350 (for example, according to a byte offset in the graph data structure). Each buffer record 352 includes a FIFO queue 360. Each FIFO queue 360 can hold data for a number of work elements 362. In correspondence with the example shown in FIG. 1, FIFO queues 360 for links 2 and 4 hold one work element, FIFO queue 360 for link 3 holds two work elements, and the remaining queues are empty.

Referring back to FIG. 3, one portion of runtime graph data structure 300 is a template 310 that is common to all instances of the same type of graph. With the exception of input count 336 of each vertex record 332, the template portion of the runtime data structure is static. Input counts 336 for the vertices are initialized to a common value for all instances of the same type of graph: the number of inputs for the corresponding vertex, indicating that none of the inputs for the vertex are initially satisfied.

The template 310 for each type of computation graph is precomputed before runtime data structures for instances of that type of graph are needed. Creating a runtime instance then essentially involves allocating memory for the entire runtime data structure 300 and copying the appropriate template 310 into the allocated memory (depending on the structure of FIFO queues 360, some minimal initialization of buffer section 350 may be required).

3. Process Pools

As introduced above, computation for vertices is implemented using process pools. For each of a number of different types of vertex computation, a pool of processes is created prior to beginning processing of work flows using computation graphs requiring that type of computation. During processing of a work flow by a graph instance, when computation of a particular type is needed to perform the computation for a vertex of the graph, a member of the process pool is dynamically associated with that vertex and remains associated with that vertex for the duration of processing of the work flow. There are generally many different pools of processes, each associated with a corresponding type of processing. Processes in one pool may be used for vertices in different graphs types, in different instances of one graph type, and for multiple different vertices in one graph type.

Each process in a process pool is a separate process (e.g., a UNIX process) that is invoked by the GEC module 220, which manages the process pools. The GEC module 220 maintains a separate work queue for each process pool. Each entry in a work queue identifies a specific vertex of a graph instance for which the process is to perform computation.

In the illustrated embodiment, when a process in a pool is first created, it performs an initialization procedure which includes mapping the shared memory segment for the graph instances into the address space of the process. After the initialization procedure completes, the process waits until it is signaled by the GEC module 220 to perform the processing associated with an element in the work queue for that pool. A number of alternative mechanisms can be used to signal the process. In one version of the system, the GEC module 220 maintains a separate control channel for passing control information between it and each process in the pool. Each pool process "blocks" while waiting for input from the control process to indicate that the pool process should execute.

Some process pools are made up of processes that reserve or consume fixed resources. An example of such a pool of processes is made up of multiple instances of a process that makes a connection to a database, such as an Oracle® database. Since resources are consumed with forming and maintaining each database connection, it is desirable to limit the number of such processes that are active. When a work element to be processed at a vertex requires a process for accessing the database, one of the processes of the pool (which has already established its connection with the database) is associated with that vertex. In this way, the overhead of starting the process is avoided, as are the initialization steps of that process that would have been required to connect to that database.

System 200 supports different approaches to configuring processes for vertices, which differ in when the vertices are associated with pool processes and when the computation for the vertices is initiated. In one type of configuration, a process is not associated with a vertex until all the data at all its input work elements are completely available. If a work element is large, it may take some time for the entire work element to be computed by the upstream vertex and to be available. This type of configuration avoids blocking the process waiting for input to become available.

Another type of configuration uses a streaming mode. A process is associated with a vertex and initiated when at least the start of each input is available. The remainder of each of its inputs becomes available while the process executes. If that input becomes available sufficiently quickly, the process does not block waiting for input. However, if the inputs do not become available, the process may block.

Another type of configuration uses a disk buffering mode in which a data flow is explicitly identified as being buffered on a disk or other storage device. For example, an upstream process writes its outputs to a disk and the downstream process is only notified when that entire input is available to be read from the disk. For such a data flow, entry 362 in the corresponding FIFO queue 360 identifies the location of the data on the disk rather than holding the data directly in the FIFO queue. This configuration conserves the shared memory segment that holds FIFO queues since a disk is used rather than using memory space buffer for inputs and outputs.

There are also various degrees of specificity of the pools of processes. One type of pool may be made up of processes that are very tailored to a particular vertex of particular type of graph. In another type of pool, the processes may be more generic and applicable to a number of different vertices. Such processes are customized at the time that they are associated with a particular vertex. For example, the processes in a pool may be made up of data translator processes, which are generic to a number of different kinds of translation. Configuration data 338 associated with a particular vertex provides information that is used to configure the translator for that particular vertex. In an even more generic pool of processes, each process may implement a virtual machine, such as a Java virtual machine (JVM), and configuration data 338 for a vertex identifies a program to execute using the virtual machine.

When a process is signaled to process an entry in the work queue for its pool, the process acts on any configuration data 338 before processing the work elements. The process accesses the configuration data by first identifying the vertex the processing is associated with, and then accessing the corresponding vertex record 332 in the shared memory segment to find the configuration data 338. The process then locates work elements 362 to process in the FIFO queues 360 for the input links for the vertex, and when complete, writes data to the FIFO queues for the vertex's output links.

4. Computation Control

Referring to FIGS. 5 to 8, system 200 uses an event-driven control approach that is coordinated by the GEC module 220.

Figure 5:
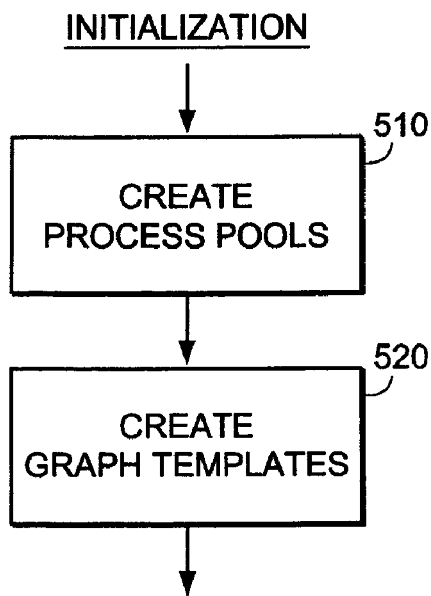
FIG. 5 is a flowchart for system initialization.

FIG. 5 is a flowchart for system initialization. The GEC module 220 first creates the process pools and their associated work queues (step 510). As part of this step, the GEC module 220 creates a separate work queue for each process pool. Next, the GEC module 220 creates a graph template 310 in its address space for each type of computation graph that may need to process a work flow, and creates a shared memory segment in which the runtime data structures for the graph instances will be created (step 520).

Figure 6:
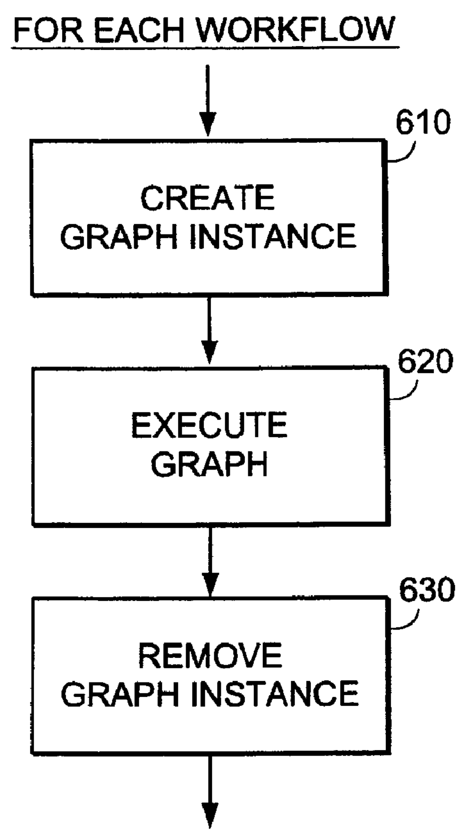
FIG. 6 is a flowchart for processing each work flow.

FIG. 6 is a flowchart for processing each work flow. When the GEC module 220 receives a request to process a work flow, it first creates a graph instance of the type of computation graph needed to process that work flow (step 610). As part of this process, the GEC module 220 allocates a portion of the shared memory segment for the runtime data structure 300 for the graph instance, and copies the graph template 310 for that type of computation graph into runtime data structure 300, thereby initializing the runtime data structure. The GEC module 220 then executes the graph instance (step 620), as described below. When the entire work flow has been processed, the GEC module 220 preferably releases the assigned resources and deletes the runtime data structure for the graph instance, thus permitting that portion of the shared memory segment to be reused for other graph instances (step 630).

Figure 7:
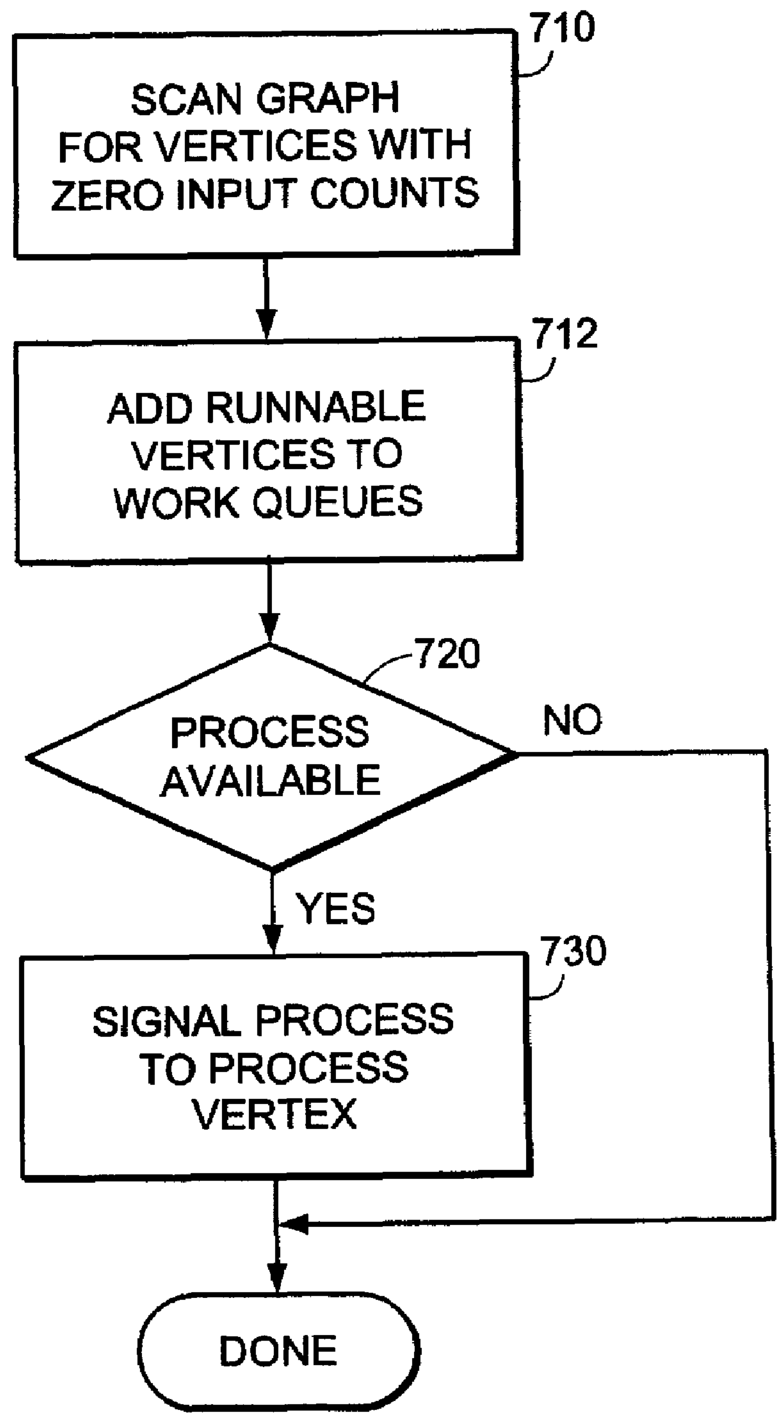
FIG. 7 is a flowchart for execution of an instance of a computation graph.

FIG. 7 is a flowchart for execution of an instance of a computation graph. Execution of a graph instance (see FIG. 6, step 620) involves first scanning the vertices of the graph to determine whether any are initialized to have an input count of zero, which indicates that they do not require an input on any flow before executing (step 710). The vertices with zero input counts are runnable and are added to the work queues for their associated process pools (step 712). Because the first vertex in this example does not have any input links, it is ready to run when execution of the graph instance begins and is put in a work queue. If there are any processes in the process pools that is available to run the computation for these vertices (step 720), then the GEC module 220 assigns that computing resource to the graph instance, immediately signals that process to run the computation, and de-queues the entry from the work queue (step 730). If no process is available from the pools, the initially runnable vertices remain in the work queues until a later time when a process in a pool completes running its computation for a vertex in another graph instance and becomes available.

A process in a process pool that runs the computation for a vertex dequeues the input work elements from the FIFO queues 360 for the input links, and queues the output work elements to the FIFO queues 360 for the output links of the vertex. Dequeue and enqueue of the work elements from the FIFO queues preferably maintains input counts 336 for the vertices so that runable vertices have zero values of their associated input count 336. If at times inputs are not available for processing, the process blocks until the inputs are produced by an upstream vertex and queued in the FIFO queues. When the process completes the computation for a work flow at a vertex, it signals the GEC module 220 that it has completed. The GEC module 220 can then assign the process to a different vertex that is queued in the work queue for that processes pool.

Figure 8:
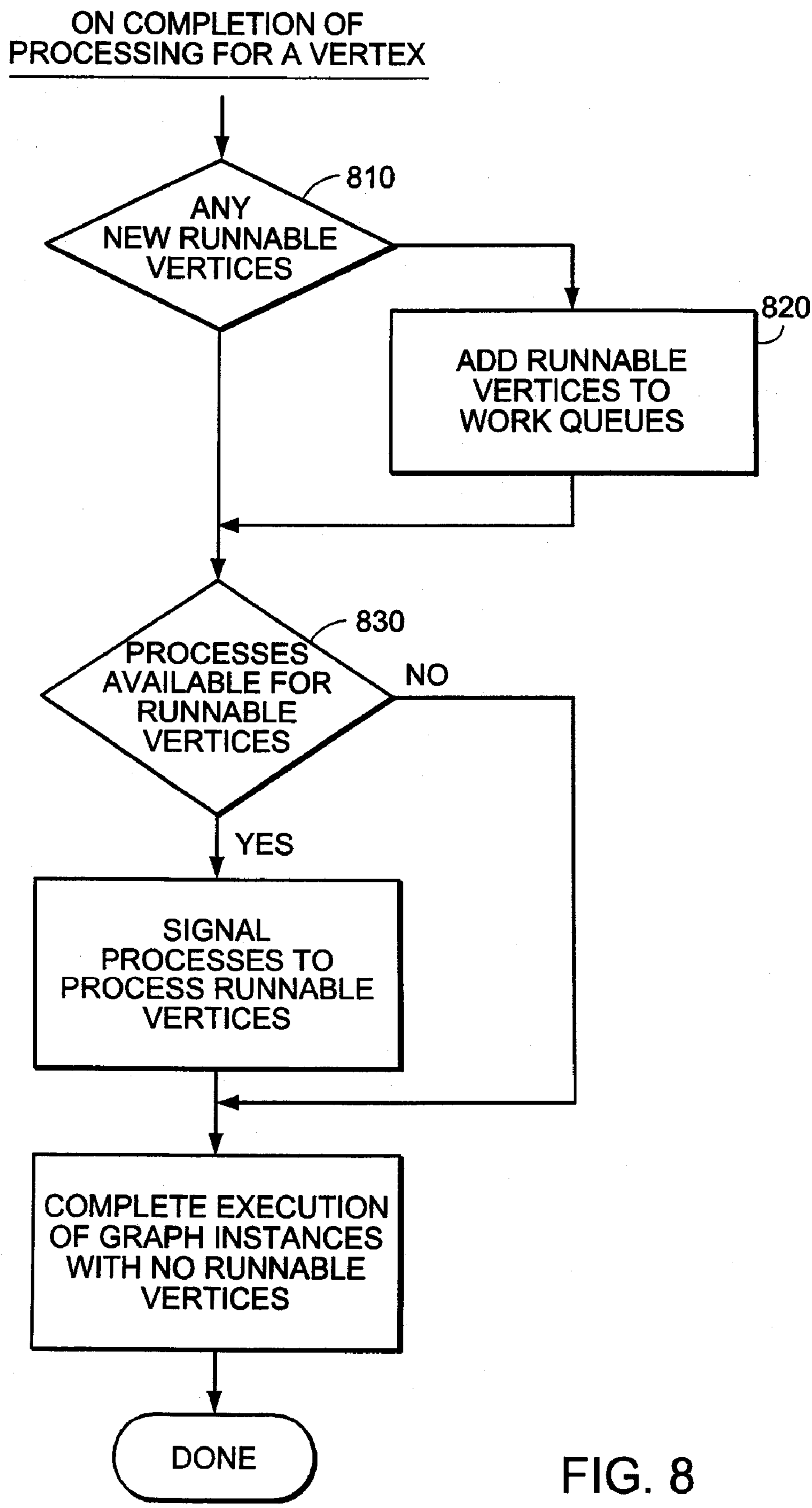
FIG. 8 is a flowchart for completion of processing for a vertex.

FIG. 8 is a flowchart for completion of processing for a vertex. When the GEC module 220 is signaled by a process that it has completed its processing, and is therefore available to be assigned to another vertex, the GEC module 220 first checks to see if there are any runnable vertices in any of the graph instances (step 810). As noted above, a runnable vertex is one for which each of its input links has a work element ready to be read, as indicated by the input count 336 being zero in the vertex record 332 for that vertex. The runnable vertices are added to the appropriate work queues for their corresponding process pools (step 820). If there are any processes available to run computations for vertices in the work queues (step 830), then all such processes are signaled to run the computations for the runnable vertices (step 840).

Finally, any graph instance for which there are no longer any runnable vertices has completed processing of its work flow, and the GEC module 220 completes the execution of that graph instance (step 850), resulting in the graph instance being removed (see FIG. 6, step 630).

The computation control described above supports a number of different work flow approaches. For example, a work flow may be associated with a single transaction, and vertices process at most one work element for each of the input links and produce zero or one work elements on their outputs. A work flow can also be associated with a stream of work elements, for example, for processing an entire batch of transactions. In such a case, each vertex processes a stream of inputs and produces zero or one output for each set of its inputs.

In order for a vertex to detect that it will not receive any more inputs, as opposed to its inputs not yet being available, each upstream vertex optionally sends an explicit terminator on its downstream links. These terminators are queued and affect the input count in the same way as work elements. Therefore, when a vertex has a terminator at each of its inputs, it outputs a terminator on each of its outputs before completing its processing. By using such terminators, a process that implements a process does not have to be preconfigured to process single transactions or streams of transactions.

5. Alternatives

In the approach to computation control described above, after a process from a process pool is assigned to a vertex in a graph instance, it is free to execute until it has completed processing of work elements in the work flow. An alternative is to limit the amount of processing at a vertex, for example, according to the amount of unprocessed output it has produced, the amount of input it has produced, or according to a processing time.

Another alternative is to relax the requirement that a process is assigned to a vertex from the time that the vertex is runnable until the vertex has completed processing of the work flow. If the vertex does not have to maintain state between processing of successive work elements in a stream of work elements for a work flow, then the process can be returned to the pool after processing a number of work elements, for example, after processing a single work element. Therefore, the same processes can then be used to perform the processing of multiple different vertices even in the same graph instance. If a process must maintain state between processing of work elements in a stream, such state can be separately maintained for the vertex and reloaded into a process when it is assigned to a vertex.

A number of optimizations of the computation control can be used. In a first optimization, propagation of work flow terminators through a graph instance avoids associating processes with vertices if all the inputs are terminators. The terminators on the inputs are dequeued, and a terminator is enqueued on each output. In another optimization, a process that completes processing for a vertex can check to see whether it is suitable for processing a downstream vertex, and then associate itself with that vertex, thereby avoiding the need to return itself to a process pool and then be reassigned to a vertex.

As another alternative, the number of processes in a process pool is optionally allowed to grow and shrink. For example, one option is that there is a minimum number of members of a pool. Depending on demand for that pool, additional members in the pool are created, followed by a gradual removal of those members as the pool processes become idle. Another option is to use a schedule for determining the number of members in a pool. For example, there may be more need for more members at different times of day. For instance, if the system is processing live transactions, a certain type of transaction may be more likely at one time of day than at another time of day.

As an alternative to, or in addition to, using "heavyweight" processes as member of process pools, a pool can be made up of a different type of process. For example, one type of alternative pool may use a single UNIX process for the pool as a whole, but the member "processes" may be lightweight threads that are pre-created and ready to run.

Another alternative is to pre-create graph pools of already instantiated computation graphs in anticipation of there being work flows that will require them. When a work flow needs a graph instance, if one is available from a graph pool, it is assigned from the pool rather than having to be created. In this way, the startup cost for a work flow is further reduced. When the computation for the work flow is completed, the graph is reset by restoring variables to their initial values prior to having been assigned to the work flow (for example, resetting input counts 336) and freeing any dynamically-assigned memory. After the graph is reset it is returned to the pool.

As with the process pools, the number of graph instances in a graph pool can be allowed to grow as needed. For instance, there might be a minimum number of instances in each graph, and more may be created as needed.

In some alternative versions of the system, a work queue for each process pool is not necessary. For instance, whenever a member pool process is ready to take on a new task, the GEC module 220 can scan through every instance of every vertex in each graph instance to see whether there is an appropriate process to take on that work. Other alternatives include us of data structures other than work queues to identify runnable vertices. For example, a hash table can be used to identify the vertices that can be run.

In the description above, pool processes may be assigned to vertices in the graph in an on-demand manner where they are not associated with a vertex until after all the inputs to that vertex are available. Another approach is to associate the processes to the vertices when the work flow is associated with the graph instance and to maintain the association until the entire work flow has been processed.

As described above, the runtime data structure defines an entire computation graph. In alternative versions of the system, the approach described above can be combined with more traditional approaches for communicating between vertices in a computation graph. For example, a separate runtime data structure can be associated with different subgraphs of the graph. Different subgraphs can then be executed on processors that do not share memory, and communication between vertices on different processors can use communication approaches such as sockets.

The approach described above can be extended to other graph specifications. For example, a hierarchical specification of a computation graph can be implemented by assembling a graph instance from templates for the various nested computation graphs.

As described above, the GEC module 220 computes and stores graph templates in working memory. As an alternative, these graph templates can be stored in external memory, such as on magnetic disks. As another alternative, the graph templates are not necessarily memory images that are reproduced to form a graph instances. For example, a graph template can include a compressed or symbolic representation that is used to form a corresponding graph instance.

In general, various alternative forms of memory sharing can be used, for instance, depending on the operating system used.

6. Applications

One application of computation graphs of the type described above is for processing financial transactions in a banking application. In general, different types of transactions require different types of computation graphs. A typical computation graph is associated with some combination of a type of customer transaction and "backend" services that are needed to process the transaction. For example, transactions can be ATM requests, bank teller inputs, and business-to-business transactions between computers or web servers. Different customers might have different backend systems, particularly when banks consolidate and customers are combined from different original banks. Their accounts may be maintained on very different backend systems even though they are all customers of the acquiring bank. Therefore, different vertices in a graph may be used to process different transactions. Different services may be associated with vertices in the graph. For instance, some of the vertices may be associated with functions such as updating a balance, depositing money in an account, or performing an account hold so funds are held in an account. In accordance with the invention, on-the-fly assignment of processes to vertices avoids the overhead of having processes for unused vertices remain idle.

7. Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmed or programmable computer systems (which may be of various architectures such as distributed, client/server, or grid) each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:

1. A method for startup, on a computer system, of a graph-based computation including:

managing multiple pools of computing resources;

forming a temporary graph instance from a stored graph template associated with the graph-based computation;

assigning computing resources to elements of the graph instance from the pools of computing resources; and executing the graph-based computation using the assigned computing resources.

2. The method of claim 1, wherein forming the temporary graph instance includes copying data representing the graph template from an external storage and forming the graph instance in a working storage.

3. The method of claim 1, wherein each pool is associated with a different type of computation.

4. The method of claim 3, wherein each of the elements is associated with a corresponding pool of the multiple pools according to a type of computation associated with each of the elements.

5. The method of claim 4, wherein associating an element with a corresponding pool includes configuring at least some of the computing resources in the pool based on configuration data associated with the element.

6. The method of claim 1, wherein the multiple pools include at least one of a pool of processes, a pool of process threads, and a pool of database connections.

7. The method of claim 1, wherein forming the temporary graph instance includes selecting the graph template from a plurality of graph templates, each associated with a different graph-based computation.

8. The method of claim 1, further including forming a second temporary graph instance from the stored graph template.

9. The method of claim 1, wherein the elements of the graph include vertices of the graph.

10. A computer program, stored on a computer-readable medium, for executing, on a computer system, graphs expressing computations, the computer program including instructions for causing a computer system to:

manage multiple pools of computing resources;

form a temporary graph instance from a stored graph template associated with the graph-based computation;

assign computing resources to elements of the graph instance from the pools of computing resources; and execute the graph-based computation using the assigned computing resources.

11. The computer program of claim 10, wherein forming the temporary graph instance includes copying data representing the graph template from an external storage and forming the graph instance in a working storage.

12. The computer program of claim 10, wherein each pool is associated with a different type of computation.

13. The computer program of claim 12, wherein each of the elements is associated with a corresponding pool of the multiple pools according to a type of computation associated with each of the elements.

14. The computer program of claim 13, wherein associating an element with a corresponding pool includes configuring at least some of the computing resources in the pool based on configuration data associated with the element.

15. The computer program of claim 10, wherein the multiple pools include at least one of a pool of processes, a pool of process threads, and a pool of database connections.

16. The computer program of claim 10, wherein forming the temporary graph instance includes selecting the graph template from a plurality of graph templates, each associated with a different graph-based computation.

17. The computer program of claim 10, wherein the computer program further includes instructions for causing the computer system to form a second temporary graph instance from the stored graph template.

18. The computer program of claim 10, wherein the elements of the graph include vertices of the graph.

19. A system for startup, on a computer system, of a graph-based computation including:

means for managing multiple pools of computing resources;

means for forming a temporary graph instance from a stored graph template associated with the graph-based computation;

means for assigning computing resources to elements of the graph instance from the pools of computing resources; and means for executing the graph-based computation using the assigned computing resources.

20. The system of claim 19, wherein forming the temporary graph instance includes copying data representing the graph template from an external storage and forming the graph instance in a working storage.

21. The system of claim 19, wherein each pool is associated with a different type of computation.

22. The system of claim 21, wherein each of the elements is associated with a corresponding pool of the multiple pools according to a type of computation associated with the element.

23. The system of claim 22, wherein associating an element with a corresponding pool includes configuring at least some of the computing resources in the pool based on configuration data associated with each of the elements.

24. The system of claim 19, wherein the multiple pools include at least one of a pool of processes, a pool of process threads, and a pool of database connections.

25. The system of claim 19, wherein forming the temporary graph instance includes selecting the graph template from a plurality of graph templates, each associated with a different graph-based computation.

26. The system of claim 19, wherein the computer program further includes instructions for causing the computer system to form a second temporary graph instance from the stored graph template.

27. The system of claim 19, wherein the elements of the graph include vertices of the graph.

28. The method of claim 1, further including allocating memory space for the graph-based computation before executing the graph-based computation.

29. The method of claim 1, further including pre-computing corresponding instances of the stored graph template associated with the graph-based computation before executing the graph-based computation.

30. The method of claim 1, wherein at least one of the multiple pools includes one or more processes that are pre-created before executing the graph-based computation.

31. The method of claim 1, wherein a computing resource from a pool is dynamically associated with an element of the graph instance and remains associated with that element for the duration of a computation associated with that element.

32. The method of claim 31, wherein managing multiple pools of computing resources includes returning the computing resource to the pool after the computation associated with the element is completed.

* * * * *